US012570035B2

(12) United States Patent
Hengl et al.

(10) Patent No.: US 12,570,035 B2
(45) Date of Patent: Mar. 10, 2026

(54) APPARATUS AND METHOD FOR FORMING PLASTIC PREFORMS INTO PLASTIC CONTAINERS WITH CONTROLLED RECYCLING OF COMPRESSED AIR

(71) Applicant: KRONES AG, Neutraubling (DE)

(72) Inventors: Benedikt Hengl, Essing (DE); Daniel Vogler, Neutraubling (DE); Markus Kulzer, Zell (DE); Dominik Meier, Parsberg (DE)

(73) Assignee: KRONES AG, Neutraubling (DE)

( * ) Notice: Subject to any disclaimer, the term of this patent is extended or adjusted under 35 U.S.C. 154(b) by 61 days.

(21) Appl. No.: 18/243,979

(22) Filed: Sep. 8, 2023

(65) Prior Publication Data

US 2024/0083090 A1      Mar. 14, 2024

(30) Foreign Application Priority Data

Sep. 8, 2022    (DE) ..................... 10 2022 122 878.9

(51) Int. Cl.
    *B29C 49/42*        (2006.01)
    *B29C 49/18*        (2006.01)
        (Continued)

(52) U.S. Cl.
    CPC ........ *B29C 49/42855* (2022.05); *B29C 49/18* (2013.01); *B29C 49/783* (2013.01);
        (Continued)

(58) Field of Classification Search
    CPC . B29C 49/18; B29C 49/783; B29C 49/42855; B29C 49/42845; B29C 49/12;
        (Continued)

(56) References Cited

U.S. PATENT DOCUMENTS

| | | | |
|---|---|---|---|
| 2004/0173949 A1 | 9/2004 | Storione et al. | 264/529 |
| 2008/0164642 A1 | 7/2008 | Hirdina | 264/528 |

(Continued)

FOREIGN PATENT DOCUMENTS

| | | | |
|---|---|---|---|
| CN | 104228042 | 12/2014 | B29C 49/28 |
| DE | 102004014653 | 10/2005 | B29C 49/16 |

(Continued)

OTHER PUBLICATIONS

Search Report issued in German Patent Appln. Serial No. 10 2022 122 885.1, dated Apr. 12, 2023, with machine English translation, 12 pages.

(Continued)

*Primary Examiner* — Monica A Huson
(74) *Attorney, Agent, or Firm* — HAYES SOLOWAY P.C.

(57)        ABSTRACT

Disclosed is a method for forming plastic preforms into plastic containers, wherein a preform is expanded into the container by exposure to a flowable medium, wherein the flowable medium is stored under a first pressure in a first pressure reservoir and is stored under a second pressure higher than the first pressure in a second pressure reservoir, and the preform is subjected to first and second blowing pressures via a flow connection between the first and second pressure reservoirs, respectively. The preform and at least at times, the flowable medium is returned to the first pressure reservoir, wherein first values characteristic of the action of the flowable medium on the preforms are predetermined, wherein taking into account the first values, second values are determined which are characteristic for a period of time of the return of the flowable medius into the first pressure reservoir.

13 Claims, 5 Drawing Sheets

(51) Int. Cl.
    *B29C 49/78*        (2006.01)
    *B29L 31/00*        (2006.01)

(52) U.S. Cl.
    CPC ................. *B29C 2049/7832* (2022.05); *B29L 2031/7158* (2013.01)

(58) Field of Classification Search
    CPC ............ B29C 2949/0715; B29C 49/06; B29C 2049/7832; B29C 2049/7833; B29K 2067/003; B29L 2031/7158
    See application file for complete search history.

(56)           References Cited

U.S. PATENT DOCUMENTS

| | | | |
|---|---|---|---|
| 2008/0191394 A1 | 8/2008 | Elliott | |
| 2009/0108505 A1 | 4/2009 | Steiner .......................... 264/535 |
| 2010/0090375 A1 | 4/2010 | Geltinger et al. | |
| 2010/0171243 A1 | 7/2010 | Zoppas et al. ................ 264/529 |
| 2011/0057343 A1 | 3/2011 | Brunner et al. ............ 264/40.1 |
| 2011/0175246 A1 | 7/2011 | Winzinger ................... 264/40.1 |
| 2011/0260350 A1 | 10/2011 | Haesendonckx et al. ...... 264/40 |
| 2012/0227825 A1 | 9/2012 | Voth et al. ...................... 137/14 |
| 2014/0110873 A1 | 4/2014 | Asbrand et al. ...... B29C 49/783 |
| 2016/0136868 A1 | 5/2016 | Haller ..................... B29C 49/78 |
| 2016/0151957 A1 | 6/2016 | Wolfe et al. | |
| 2016/0176099 A1 | 6/2016 | Knapp | |
| 2019/0315039 A1 | 10/2019 | Huettner et al. ........ B29C 49/06 |
| 2023/0100387 A1 | 3/2023 | Brunner et al. | |
| 2024/0083090 A1 | 3/2024 | Hengl et al. | |
| 2024/0083098 A1 | 3/2024 | Meier et al. | |
| 2024/0408808 A1 | 12/2024 | Kulzer et al. | |

FOREIGN PATENT DOCUMENTS

| | | | | |
|---|---|---|---|---|
| DE | 102008034934 | 4/2009 | ............ | B29C 49/78 |
| DE | 102009041013 | 3/2011 | ............ | B29C 49/18 |
| DE | 102011110962 | 2/2013 | ............ | B29C 49/42 |
| DE | 102012110023 | 4/2014 | ............ | B29C 49/18 |
| DE | 102014116891 | 5/2016 | ............ | B29C 49/78 |
| EP | 1175990 | 1/2002 | ............ | B29C 49/78 |
| EP | 1974892 | 10/2008 | ............ | B29C 49/78 |
| EP | 2345524 | 7/2011 | ............ | B29C 49/78 |
| EP | 2441562 | 4/2012 | ............ | B29C 49/42 |
| EP | 2497619 | 9/2012 | ............ | B29C 49/42 |
| EP | 2352633 | 12/2012 | ............ | B29C 49/78 |
| EP | 2722153 | 4/2014 | ............ | B29C 49/78 |
| GB | 2431372 | 4/2007 | ............ | B29C 49/18 |
| WO | 2007077241 | 7/2007 | ............ | B29C 49/78 |
| WO | 2013023789 | 2/2013 | ............ | B29C 49/16 |

OTHER PUBLICATIONS

Search Report issued in German Patent Appln. Serial No. 10 2022 122 880.0, dated Apr. 28, 2023, with machine English translation, 7 pages.

Search Report issued in German Patent Appln. Serial No. 10 2022 122 879.7, dated Mar. 14, 2023, with machine English translation, 11 pages.

Search Report issued in German Patent Appln. Serial No. 10 2022 122 883.5, dated Mar. 14, 2023, with machine English translation, 9 pages.

Search Report issued in German Patent Appln. Serial No. 10 2022 122 878.9, dated Apr. 13, 2023, with machine English translation, 10 pages.

Extended Search Report issued in EPO Patent Appln. Serial No. 23193133.8-1014, dated Feb. 5, 2024, with machine English translation, 8 pages.

Extended Search Report issued in EPO Patent Appln. Serial No. 23193217.9-1014, dated Feb. 22, 2024, with machine English translation, 19 pages.

Extended Search Report issued in EPO Patent Appln. Serial No. 23193185.8-1014, dated Feb. 5, 2024, with machine English translation, 8 pages.

Extended Search Report issued in EPO Patent Appln. Serial No. 23194549.4-1014, dated Feb. 7, 2024, with machine English translation, 9 pages.

Extended Search Report issued in EPO Patent Appln. Serial No. 23194845.6-1014, dated Feb. 9, 2024, with machine English translation, 8 pages.

APPARATUS AND METHOD FOR FORMING PLASTIC PREFORMS INTO PLASTIC CONTAINERS WITH CONTROLLED RECYCLING OF COMPRESSED AIR

BACKGROUND OF THE INVENTION

The present invention relates to an apparatus and a method for forming plastic preforms into plastic containers. In the area of the beverage manufacturing industry, it has long been known that heated plastic preforms are formed into plastic containers and expanded in particular. For this purpose, the plastic preforms are expanded into the containers inside blow molds using a flowable medium, usually pressurized air (but sometimes also by means of liquids). Typical machines that perform these processes are stretch blow molding machines.

In prior art stretch blow molding machines, different pressure levels are used for forming containers, which are brought into flow communication with the container by means of a valve arrangement and particularly a valve block. Prior art methods with two or three pressure stages in the pressure build-up are known. However, in the applicant's internal prior art, configurations with four pressure stages are already being tested. Air is usually used as the pressurized medium, but other gaseous fluids and also liquids, such as the beverage to be filled, can also be used.

A pressure build-up phase sometimes has four pressure stages. The individual pressure levels are set by the machine operator in the prior art. These pressure stages, for example four, are applied to the container one after the other in ascending order via the valves located on a valve unit such as a valve block.

After the highest pressure is held for a determined time, the recycling phase of the process follows. In the following, the recycling phase is understood to be the phase in which the flowable medium (particularly from the container to be expanded) is returned to the individual pressure reservoirs (which may be annular channels, for example).

During the recycling phase, the valves of the individual pressure stages are advantageously opened one after the other in descending order. The pressure prevailing in the vessel is relieved to the respective pressure level of the individual stages (and in particular into the respective pressure reservoirs), wherein air mass flows from the vessel into a pressure reservoir.

A valve opening time of the valves during the recycling phase determines the air mass which is recycled. This assumes a pressure gradient between the container and the pressure reservoir of the individual stages. If the individual valves are open long enough for complete pressure equalization to occur between the container and the respective pressure reservoir, a longer valve opening time will not result in a higher recycled mass. In the prior art, the valve opening times are controlled in such a manner that the pressure set by the operator in the pressure reservoir is reached as far as possible.

In the prior art, the starting times of the individual recycling cycles are set on the basis of the unloading time of a container, which is characteristic for the respective machine, using the valve opening times calculated by a regulating device.

A regulating deviation detected by the regulating device is the difference between a set pressure and the actual pressure of a pressure reservoir of the respective pressure stage. In the applicant's internal prior art, some parameters of the blowing curve are set by an operator and some are determined by the machine itself.

Of particular importance for the compressed air consumption of the respective system is the pressure in the container at the respective unloading time, since the pressure consumption per container is calculated from the unloading pressure, the container volume and the dead space of the station.

A disadvantage of the current approach is the intended user input of the intermediate blowing pressures by the user because this allows a recycling control unit to find an optimum for this input at best. This means that the respective reservoir pressures are reached, but a relief pressure is far above the lowest possible relief pressure. The lowest possible relief pressure corresponds to the pressure of the lowest pressure stage in the pressure build-up.

Another disadvantage is the recycling start times, which depend on the valve opening times. If one feeds back into the pressure reservoir at an inopportune time, for example when the reservoir pressure is at its highest, the recycling potential is reduced. An additional disadvantage of the current approach is that the characteristics of air extraction from the reservoir in the ascending branch (pressure build-up phase) are not taken into account during recycling and thus recycling potential remains unused.

The object of the present invention is therefore to provide such apparatuses and methods more energy efficient. In particular, the object is to improve the efficiency gains that can be achieved through compressed air recycling.

SUMMARY OF THE INVENTION

In a method according to the invention for forming plastic preforms into plastic containers, a plastic preform (and preferably a plurality of plastic preforms) is expanded into the plastic container by being acted upon by a flowable and in particular gaseous medium and in particular air, wherein the flowable medium is stored under a first pressure in a first pressure reservoir and is stored under a second pressure which is higher than the first pressure in a second pressure reservoir, and wherein the plastic preform is acted upon by a first blowing pressure via a flow connection between the first pressure reservoir and the plastic preform and is acted upon by the second blowing pressure via a flow connection between the second pressure reservoir and the plastic preform. Preferably, the second blowing pressure is applied after the first blowing pressure.

Furthermore, at least intermittently, flowable medium (particularly pressurized air) is returned (particularly from the container) to the first pressure reservoir, wherein first values characteristic of the application of the flowable medium to the plastic preforms are preferably predetermined.

In a first embodiment according to the invention, taking into account the first values, second values are determined which are characteristic of a time or period (and in particular a starting time) of the return of the flowable medium into the first pressure reservoir.

In a second method according to the invention, a point in time and/or period of time for returning the flowable medium (and in particular a starting point in time) to the reservoir is selected and/or determined as a function of a point in time and/or period of time for applying the flowable medium to the plastic preform. In a further method according to the invention, at least one point in time and/or period of time (and in particular a start time for a return to the first pressure reservoir) is determined as a function of a point in time and/or period of time (and in particular a start time) that is characteristic of the application of pressure from a pressure reservoir to the plastic preform.

Furthermore, it would also be conceivable to apply the methods of the invention described here cumulatively. It would also be possible to use different methods for different pressure levels and/or pressure reservoirs, approximately for an intermediate pressure Pi the first of the methods described above and for an intermediate pressure Pi+ the second method.

Preferably, at least two of the start times are determined. Particularly preferably, the starting times for the return of the flowable medium are determined in at least one pressure reservoir, which is used for the receptacle of an intermediate blowing pressure.

Particularly preferably, said first values are at least partially and preferably completely predetermined by a user. However, it would also be possible that these first mentioned values are calculated by a machine controller. These values can, for example, be determined as a function of the container to be produced. It would also be conceivable for these values to be determined and/or ascertained as a function of the plastic preform to be expanded.

Particularly preferably, the plastic preform is transported along a predetermined transport path while being exposed to the flowable medium. Particularly preferably, a plurality of plastic preforms are at least partially simultaneously (or in at least partially overlapping time periods) exposed to the flowable medium in order to be expanded.

Through the two procedures according to the invention, an increase in efficiency can be achieved with regard to the blowing air. In particular, the (start) times at which the recycling of air, hereinafter referred to as recycling, is performed can be determined in this manner.

In a preferred method, the first values are selected from a group of values comprising a magnitude of a first pressure (in particular a pre-blow pressure P1), a magnitude of a second pressure (in particular a first intermediate blow pressure Pi), which is preferably higher than the pre-blow pressure), a magnitude of a third pressure (in particular a second intermediate blow pressure Pi+) which is preferably higher than the first intermediate blowing pressure Pi), a magnitude of a fourth pressure (in particular a final blowing pressure P2), a point in time for the start of pressurization with the first pressure, a point in time for the start of pressurization with the second pressure, a point in time for the start of pressurization with the third pressure a time for the start of the application of the fourth pressure, a duration of the application of the first pressure, a duration of the application of the second pressure, a duration of the application of the third pressure, a duration of the application of the fourth pressure, a time for the end of the application of the first pressure, a time of termination of the application of the second pressure, a time of termination of the application of the third pressure, a time of termination of the application of the fourth pressure, the time of the start of a discharge of (residual) pressure into the environment (exhaust) and similar.

Particularly preferably, these times are controlled by the switching times of valves which are arranged at the forming station and preferably each forming station of a plurality of forming stations. The individual time durations or also the time points can be controlled by means of corresponding valves or their switching times. Offsets can also be added, which take into account a reaction time of the valves.

Furthermore, values can also be controlled, such as a pressure level within the pressure reservoirs. Particularly preferred is at least one pressure reservoir and preferably several pressure reservoirs are designed as annular channels. Preferably, the pressure reservoirs are arranged on a movable carrier, on which the forming stations are also preferably arranged.

In a further preferred method, the plastic preforms are transported along a predetermined (particularly circular) transport path, and preferably expansion takes place during this transport. Preferably, the plastic preforms are placed in blow molds and subsequently exposed to the flowable medium. It is possible to open the blow molds, insert the plastic preforms into them and then close the blow molds again. Particularly preferably, the plastic preforms are stretched in their longitudinal direction. This is done, particularly preferably, by inserting a stretching bar into the interior of the plastic preforms. Particularly preferably, this stretching of the plastic preforms in their stretching direction or in their longitudinal direction takes place at least partially simultaneously with the application of different pressures.

Particularly preferably, the movement of the stretching bar is also controlled taking into account at least one start time for pressurization of the plastic preform. In this manner, the forming process can be optimized even further.

Particularly preferably, the plastic preform and preferably the plastic preforms are subjected to at least three and preferably at least four different pressures or pressure stages for its or their expansion. Particularly preferably, recycling or recirculation of the gaseous medium takes place in at least two pressure reservoirs, preferably in at least three pressure reservoirs.

Particularly preferably, an expansion pressure is determined before and/or during pressurization of the plastic preform and/or a recycling pressure is determined during recirculation of the flowable medium into a pressure reservoir. Particularly preferably, a pressure of the gaseous medium inside the container is determined at least intermittently and preferably continuously.

Particularly preferably, a pressure of the flowable medium is determined at least intermittently and preferably continuously within at least one pressure reservoir, preferably within a plurality of pressure reservoirs, and preferably within all pressure reservoirs. Particularly preferably, these pressures are also used for the controller of the respective times or periods for the application of the flowable medium to the plastic preforms and/or for the return of the flowable medium (i.e., particularly the recycling) to the pressure reservoir(s).

Preferably, a first pressure or pressure stage is less than 12 bar, preferably less than 10 bar, more preferably less than 8 bar, and most preferably less than 6 bar.

Preferably, a first pressure or pressure level is greater than 2 bar, preferably greater than 3 bar, and more preferably greater than 4 bar.

The apparatus or method described herein is based on different approaches to optimize compressed air consumption.

In one method, the start times of the respective recycling branches, i.e., the times at which recycling occurs in the individual pressure reservoirs, are calculated as a function of the start times of the respective pressure stage in the pressurization phase. For example, it is possible for a start time for a pressure build-up and a start time for recycling to be determined in dependence on one another and, in particular, synchronized with one another. In this manner, simultaneous withdrawal from and supply to the pressure reservoir are achieved. Preferably, the following relationship applies to the start time of recirculation or recycling at a determined pressure level:

$$\text{Start time recycling } Px = \text{Start time pressure build-up } Px + n \times A.$$

The factor A is calculated from 3600/the station output [b/h/c] (bottles per hour per cavity) and/the number of stations. The variable n depends on different quality parameters of the container, for example a pressure holding time of the highest level and is therefore also dependent on the customer object. The variable n is preferably calculated depending on these operator inputs. The variable n is an integer multiple (1, 2, 3, . . . ).

In a further method, the difference in pressure levels resulting for the respective pressure stage during pressure build-up and recycling is controlled and, in particular, regulated to a minimum. For this purpose, the pressure build-up and recycling or the pressures occurring there are measured. A valve opening time of the individual intermediate blowing pressure stages, particularly during the pressure build-up phase, is preferably used as the nominal variable for this control.

The starting pressure levels can be preset, for example by a machine operator, but they can also be preset by a machine controller or calculated or adjusted by means of artificial intelligence.

In a further preferred method, these starting pressure levels are preset or specified by a—preferably automated—calculation method. Subsequently, the fresh air replenishment is preferably deactivated. The pressure reservoirs can be filled exclusively by recycled air. The pressure levels in the pressure reservoirs preferentially set themselves based on the conditions of the physical system.

Preferably, for at least one pressure reservoir, the supply of fresh air is at least temporarily interrupted, particularly during normal operation of the apparatus.

The procedure described above is preferably first carried out individually for each individual pressure stage, and particularly preferably starting from the highest intermediate blowing pressure level to the lowest intermediate blowing pressure level. Subsequently, iterations of this procedure are preferred until the pressures in the pressure reservoirs do not change significantly over a certain number of iterations.

Preferably, the flowable medium is recirculated between a plurality of forming stations and the respective pressure reservoir, and preferably between all forming stations and the respective pressure reservoir (and preferably a plurality of pressure reservoirs).

Preferably, the return between the individual stations is staggered.

Particularly preferably, a value is determined taking into account an expansion pressure (i.e., the pressure when the plastic preform is acted upon) and the recycling pressure (i.e., the pressure that is present at the start time of the recycling) and, in particular, a comparison value is determined taking into account the expansion pressure and the recycling pressure, and, particularly preferably, this second value (in particular a start time for the recycling or the recycling of the flowable medium) is determined taking into account this comparison value. It is possible to measure this comparison value, particularly by means of two or more sensor devices, but the comparison value can also be determined from a blowing curve. This comparison value can be used as a controlled variable for a controller which regulates the start time for the recirculation of the flowable medium.

In a further preferred method, the comparison value is a difference and/or a quotient of the expansion pressure and the recycling pressure, and preferably the second value is controlled such that this comparison value becomes minimal. For example, a difference between the expansion pressure and the recycling pressure can be determined and the latter can be controlled to a minimum (particularly by means of changing the start time for recycling).

The same would be possible with a quotient. Also, a certain factor can be set in the calculation, which is determined by a user, for example. Thus, it is possible for the control to take into account whether or not this comparison value falls below a determined limit value. Accordingly, an adjustment can be made.

In a further preferred method, at least one valve opening time is changed for control, and preferably multiple valve opening times are changed. Particularly preferably, at least one valve opening time of a valve controlling an intermediate pressure stage (Pi and/or Pi+) is changed. Particularly preferably, a plurality of valve opening times are changed and, in particular, valve opening times of those valves which are responsible for supplying different intermediate blowing pressure stages. In another preferred method, the control or adjustment to a certain minimum of the pressure differences is done iteratively.

Particularly preferably, the method is performed for several pressure stages and/or several pressure reservoirs, and particularly preferably, this method is first performed for a higher pressure stage and subsequently for a lower pressure stage.

In a further preferred method, at least one time and/or time period for a return to the first pressure reservoir is determined as a function of a time and/or time period that is characteristic of the application of pressure from the first pressure reservoir to the plastic preforms.

Similarly, it is also possible to determine a time and/or period for a return to the second pressure reservoir as a function of a time and/or period characteristic of the application of pressure from the second pressure reservoir to the plastic preform.

In a further preferred method, in order to determine the time and/or time period for the return to the first pressure reservoir, at least one parameter is taken into account which is characteristic for the container to be expanded and/or for a time period of the application of a further pressure level.

In particular, the start times for a return to the first pressure reservoir and/or to the second pressure reservoir are determined in this mentioned manner. As an alternative to determining the respective time, it would also be possible to determine the time indirectly, for example via a position of the forming station along its transport path. As mentioned above, the forming stations are preferably transported on a rotatable carrier such as a blowing wheel. Thus, it would be possible to start returning the flowable medium to the respective pressure reservoir, at a predetermined position of the forming station along the transport path.

For example, it would be possible for pressurization by the first pressure reservoir to begin when the forming station is arranged in a predetermined degree position, such as a 40° position, and accordingly to begin recirculation when the forming station has arrived at another degree position, such as a 150° position.

In a further preferred method, the determination of the time, in particular of a start time and/or of the time period for the return to the first pressure reservoir, is carried out at least taking into account a parameter which is characteristic for the container to be expanded and/or for a time period of the application of a further pressure level. Thus, it is possible that the times and/or pressure durations of the other pressure levels are also taken into account to determine the respective start times.

In addition, time periods of application of a first pressure (P1 pressure), an intermediate pressure (PI) or a final blowing pressure (P2) can also be taken into account.

In a further preferred method, at least one point in time and/or time period for a return to the second pressure reservoir is also determined as a function of a point in time or time period (in particular a starting point in time) that is characteristic of the application of pressure from the second pressure reservoir to the plastic preform. In particular, the start time for the return of the flowable medium is determined as a function of the start time for the application of this pressure to the plastic preform.

In a further preferred method, the plastic preform is subjected to at least three and preferably at least four different pressure levels for expansion. Preferably, the application of the highest pressure level takes the longest time.

In a further preferred method, in order to determine a time and/or period for the return to the first pressure reservoir, at least one parameter selected from a group of parameters characteristic of a number of the forming stations or a power of the forming stations is taken into account.

In a further preferred method, the valve opening times for pressurizing the plastic preform with flowable medium from at least one pressure reservoir are set in dependence on (and/or are in dependence on) the valve opening times for returning the flowable medium to said pressure reservoir, and in particular correspond thereto. Particularly preferably, these valve opening times are matched to each other or differ from each other by a ratio and/or difference that is less than 20%, preferably less than 15%, preferably less than 10%, and preferably less than 5%. In a preferred method, the respective durations are controlled and particularly regulated. However, it would also be possible for these durations to be specified as well.

In a further preferred method, at least one valve opening time and/or at least one admission duration is changed to control the apparatus.

The present invention is further directed to an apparatus device for forming plastic preforms into plastic containers, comprising at least one forming station having an impingement means adapted and determined to expand a plastic preform into the plastic container by impingement of a flowable medium. Further, the apparatus has a first pressure reservoir for storing the flowable medium at a first pressure and a second pressure reservoir for storing the flowable medium at a second pressure higher than the first pressure, and a first flow connection is provided (and/or producible) between the pressure reservoir and the plastic preform to apply the first blowing pressure to the plastic preform via said flow connection between the first pressure reservoir and the plastic preform.

Furthermore, a second flow connection between the second pressure reservoir and the plastic preform is also provided (and/or can be provided) to apply a second blowing pressure to the plastic preform via this second flow connection between the second pressure reservoir and the plastic preform. Furthermore, the flowable medium (in particular pressurized air) can be returned from the container to the first pressure reservoir at least from time to time, and a control device is preferably provided which specifies first values characteristic of the application of the flowable medium to the plastic preforms.

In a first embodiment according to the invention, a processor device determines, taking into account the first values, second values which are characteristic of a time or period and, in particular, a starting time of a return of the flowable medium into the first pressure reservoir.

In a second embodiment according to the invention, at least one time and/or time period (and in particular a starting time) for a return (of flowable medium) to the first pressure reservoir can be determined as a function of a time and/or time period which is characteristic of the application of pressure from a pressure reservoir to the plastic preform.

In both embodiments, it is therefore proposed that a parameter for the return of the pressure and, in particular, a starting time can be set. In both cases, these times or periods and in particular one or more starting times are determined on the basis of at least one or more values which are characteristic of the impact on the plastic preforms.

Particularly preferably, the first characteristic values are selected from a group comprising a first pressure level (P1), a second pressure level, in particular a first intermediate blowing pressure level (Pi), a third pressure level, in particular a second intermediate blowing pressure level (Pi+), a fourth pressure level, in particular a finished blowing pressure level (P2), a time and/or period of time for the application of the first pressure level, a time or period of time for the application of the second pressure level, a time or period of time for the application of the third pressure level, and a time or period of time for the application of the fourth pressure level (final blowing pressure). It should be noted that in the context of the present application the terms pressure and pressure level are used synonymously.

Particularly preferably, the apparatus has a plurality of such forming stations which are used to form the plastic preforms into plastic containers. Particularly preferably, the forming stations each have blowing nozzles which can be applied to the plastic preforms in order to subject them to the blowing pressure. Thus, these blowing nozzles preferably form components of the above-mentioned pressurizing devices. In a further preferred embodiment, the forming stations each have stretching bars that can be inserted into the plastic preforms to stretch them in their longitudinal direction.

In a further preferred embodiment, the forming stations each have control devices which control the application of the different pressures or pressure levels to the plastic preforms. Valve arrangements such as valve blocks can be provided to control the application of different pressure levels to the plastic preforms. Particularly preferably, at least one of these valve arrangements and preferably the valve arrangements have at least one valve, in particular a controllable valve and in particular a proportional valve.

In a further preferred embodiment, the apparatus has at least one sensor device suitable and determined to detect a pressure of the flowable medium in at least one pressure reservoir and/or in the container. Particularly preferably, both pressure reservoirs and, if applicable, the multiple pressure reservoirs are each assigned at least one such sensor device. In addition, at least one and preferably a plurality of forming stations are each assigned at least one sensor device which is suitable and determined for detecting a pressure in the container to be expanded.

In a further preferred embodiment, the forming station has a valve arrangement that allows the plastic preform to be subjected to at least three, and preferably at least four, different pressure levels. In this context, this control device or the valve arrangement can also be suitable and determined for controlling the return of the flowable medium from the plastic preform into at least one pressure reservoir and preferably into several pressure reservoirs. Preferably, the same valve that serves to pressurize the container with a determined pressure level is also suitable and determined to effect the return of the flowable medium from the container to the corresponding pressure reservoir.

In a further preferred embodiment, the apparatus has a comparison device which compares an expansion pressure and/or a pressure applied to the plastic preforms and a recycling pressure (in particular a pressure at which the flowable medium is fed back into the pressure reservoirs) with one another and, particularly preferably, outputs at least one value which is characteristic of this comparison. In a preferred method, it is possible to control and/or regulate the return of the pressure with reference to this comparison value (and in particular to control and/or regulate the above-mentioned start times. In this manner, a very resource-saving apparatus can be achieved.

In a further preferred embodiment, the forming station has a valve arrangement which controls the application of the flowable medium to the plastic preform and/or the return of the flowable medium to at least one pressure reservoir, wherein the controller preferably takes place at least partially taking into account a value which is characteristic of a comparison between an expansion pressure and a recycling pressure. Particularly preferably, this procedure can take place for a plurality of and especially preferably for all forming stations.

Preferably, the flowable medium can also be returned from the plastic container to be expanded into the second pressure reservoir. Particularly preferably, the flowable medium can be returned from the plastic container to be expanded to all pressure reservoirs, in particular with the exception of the one holding the highest pressure (i.e., in particular the final blowing pressure).

In a further preferred embodiment, the device has a processor device which is suitable and intended for determining a start time of a return of the flowable medium into the X-th pressure reservoir and preferably taking into account a start time for the application of the plastic preform and/or taking into account a total number of forming stations.

The inventions make it possible to minimize the compressed air consumption of the apparatus. The applicant was able to determine that, surprisingly, air consumption depends significantly on the pre-blowing pressure level and the cylinder volume as well as the dead spaces. In contrast, the finished blowing pressure (with at least four pressure stages) plays only a subordinate role.

In a further preferred embodiment, the apparatus has a control device and, in particular, a regulating device which controls and, in particular, regulates the application of the different pressure levels to the individual pressure reservoirs. This can be, for example, a so-called dome pressure regulator.

In particular, at least the pressure reservoir that receives the highest pressure, in particular the finished blowing pressure, has such a control device.

Preferably, the apparatus has a distribution device, and in particular a rotary distributor, which distributes the flowable medium (in particular the pressurized air) to the pressure reservoirs starting from a (in particular stationary) pressure source such as a compressor.

Preferably, the aforementioned control device or regulating device is arranged between the distribution device and at least one pressure reservoir and, in particular, can be connected fluidically to the pressure reservoir and the distribution device.

In addition, the complexity of the apparatus for the machine operator can also be reduced, as the number of parameters to be set is reduced.

Furthermore, a compressed air source, such as a high-pressure compressor for plant supply, can be dimensioned to a smaller required mass and a cost reduction can be achieved.

BRIEF DESCRIPTION OF THE INVENTION

Further advantages and embodiments result from the accompanying drawings. In the figures.

DETAILED DESCRIPTION OF THE INVENTION

Figure 1:
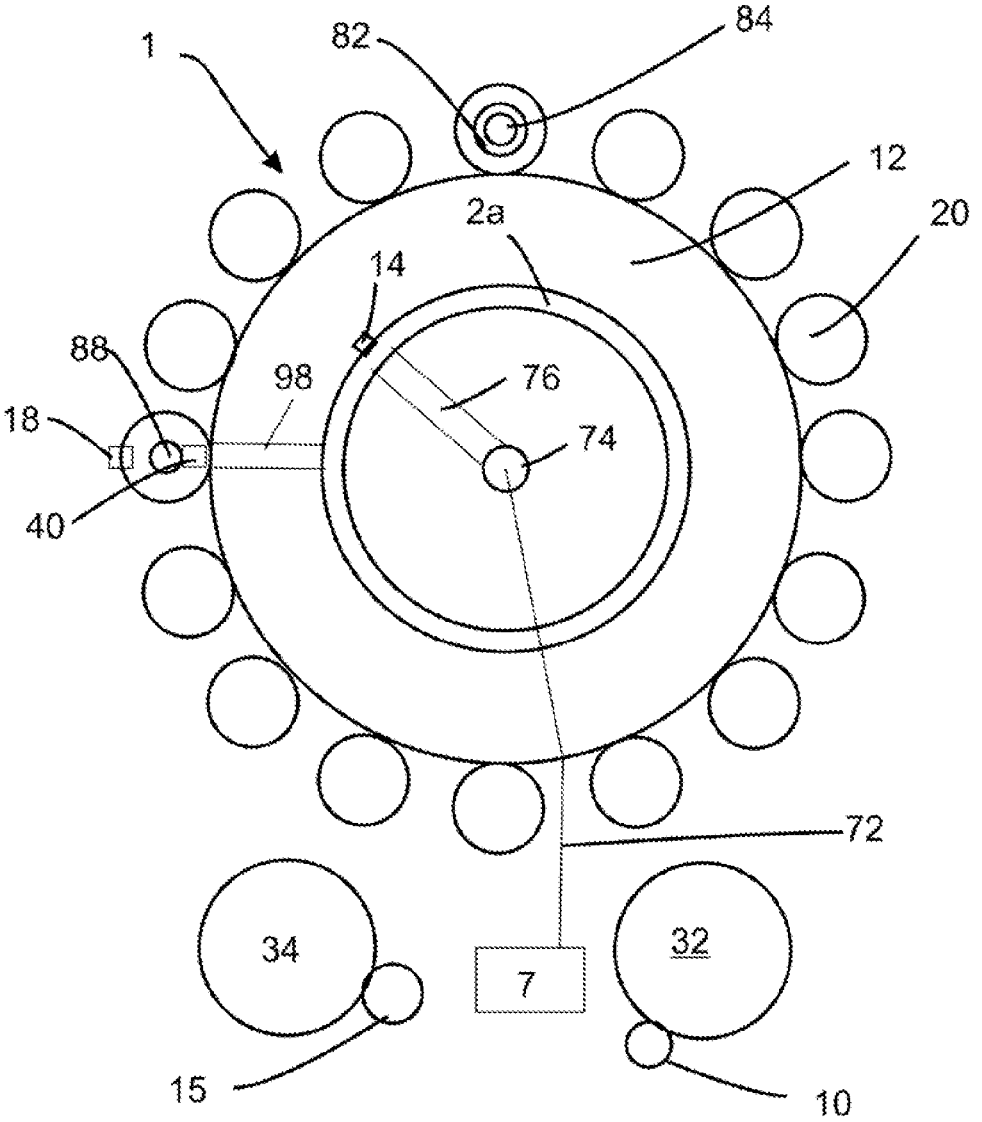
FIG. 1 shows a schematic view of an apparatus according to the invention.

FIG. 1 shows an apparatus 1 for forming plastic preforms 10 into plastic containers 15. This apparatus has a rotatable carrier 12 on which a large number of forming stations 20 is arranged. These individual forming stations each have blow molds 82, as well as pressurizing devices 84 for applying a flowable medium to the plastic preforms 10, in particular pressurized air for expanding the plastic preforms.

Reference sign 88 denotes a stretching rod used to stretch the plastic preforms in their longitudinal direction. Preferably, all forming stations have such blow molds 82, pressurizing devices as well as stretching bars 88. The number of these forming stations is preferably between 2 and 100, preferably between 4 and 60, preferably between 6 and 40.

The plastic preforms 10 are fed to the apparatus via a first transport apparatus 32, such as in particular but not exclusively a transport star. The plastic containers 15 are transported away via a second transport apparatus 34.

Reference sign 7 denotes a pressure supply device, such as a compressor or also a compressed air connection. The pressurized air is conveyed via a connecting line 72 to a rotary distributor 74, and from this it is indicated via a further line 76 to the pressure reservoir 2a, which in this case is an annular channel.

In addition to such annular channel 2a shown, further annular channels are preferably provided, which are, however, concealed by, e.g., lie underneath, the annular channel 2a in the illustration shown in FIG. 1. In addition, further connecting lines are preferably also provided with which these further pressure reservoirs can be supplied.

Reference sign 98 denotes a connecting line that delivers pressurized air to a forming station 20. Preferably, each of the annular channels is connected to all forming stations via corresponding connecting lines.

Reference sign 14 denotes a sensor device which serves to detect the pressure within the pressure reservoir-preferably continuously. The other pressure reservoirs (not shown) also preferably have such sensor devices or pressure measuring devices.

Reference sign 18 denotes a pressure measuring device which is suitable and determined for detecting a pressure of the flowable medium within the container to be expanded.

Reference sign 40 denotes a valve arrangement, such as a valve block, which is used to control the application of the flowable medium to the plastic preforms and preferably also the recycling into the individual pressure reservoirs. This valve arrangement may have a processor device (not shown) that controls the respective start times for the returns of the flowable medium. However, this processor device can also be part of a (superordinate) machine controller.

Figure 2:
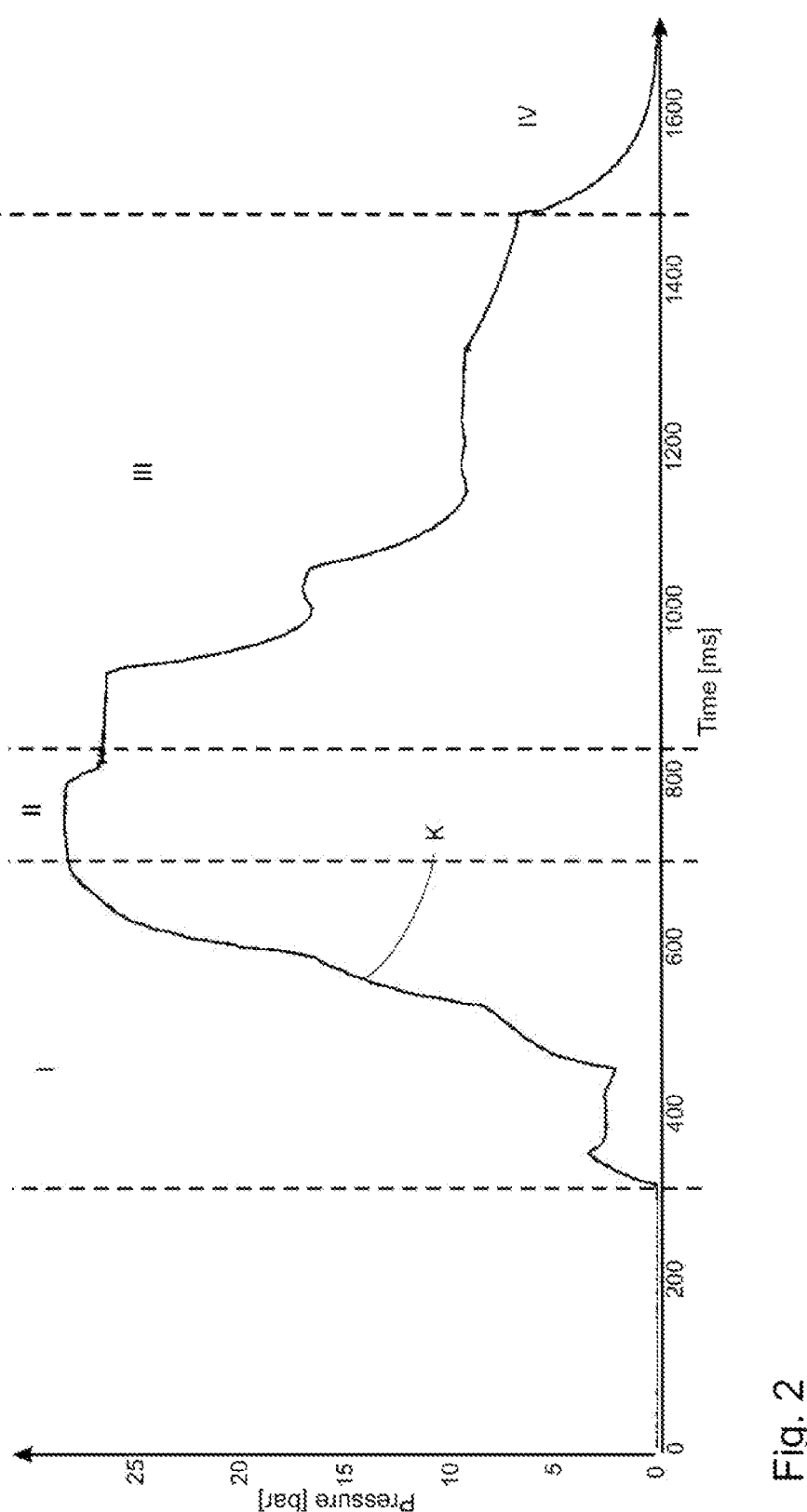
FIG. 2 shows a pressure curve during the expansion of plastic preforms.

FIG. 2 shows an illustration of a blowing curve K, which represents the pressure curve during expansion of the plastic preforms over time. The portion I identifies a pressure build-up phase and the portion III identifies a recycling phase (i.e., in particular, the phase in which pressure is returned from the vessel to the individual pressure reservoirs). During the pressure build-up phase, the plastic preform is successively subjected to several pressure levels, here in particular to four pressure levels. Phase II characterizes a final blow molding phase during which the plastic preform is already formed but is kept in this state by applying a final blow molding pressure.

Portion IV marks a relief phase in which any remaining pressurized air is released from the formed container into the environment.

In portion I, the plastic preform is subjected to increasing pressures by switching the individual valves accordingly and is thus formed. After final blowing, pressure is again released in stages from the container that has been blown in the meantime.

Figure 3:
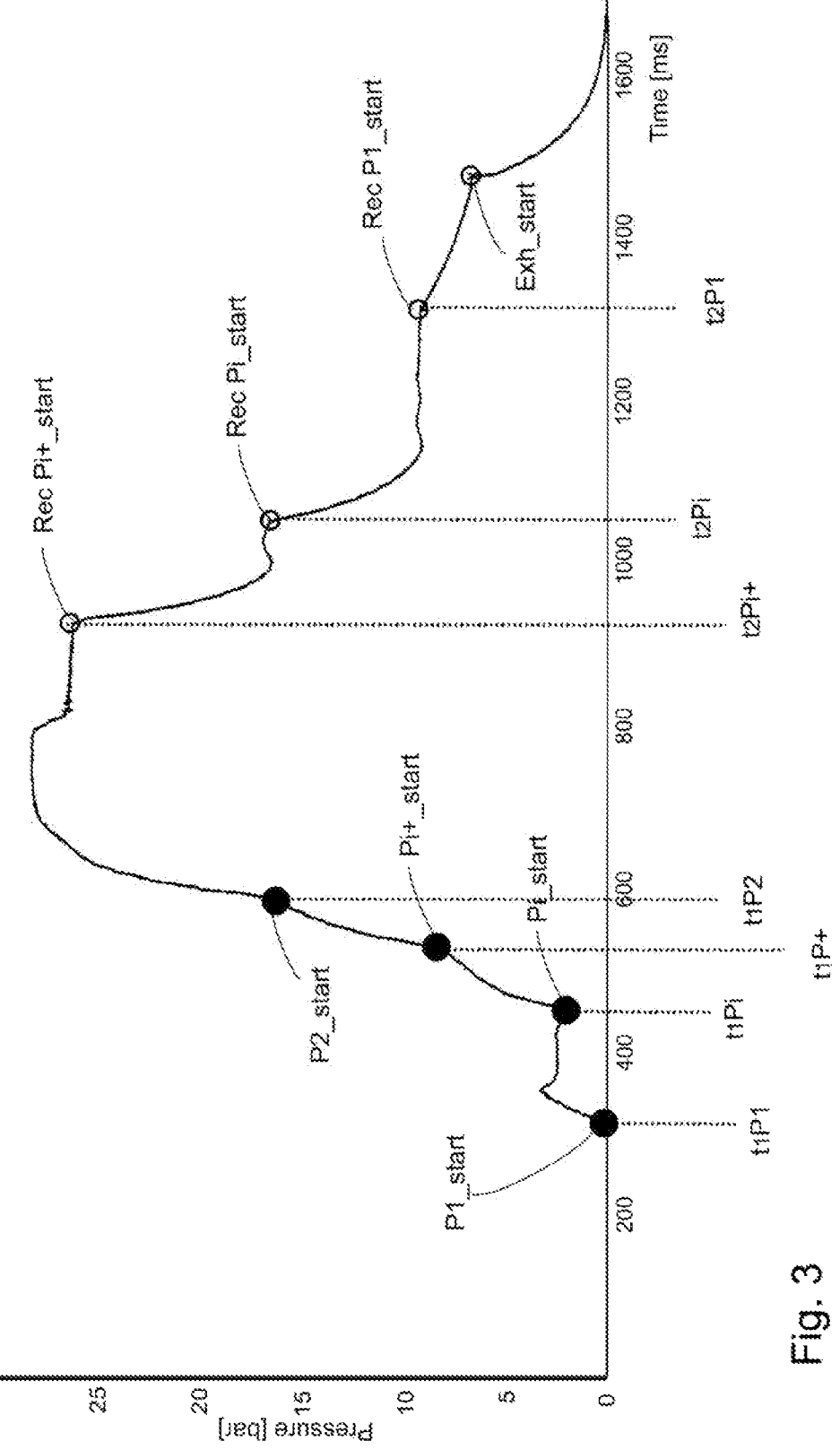
FIG. 3 shows a view illustrating the individual start times.

FIG. 3 shows a view in which the respective starting points for applying the different pressure levels or pressures to the plastic preform are shown (filled dots). In addition, the respective start times for the return of the gaseous medium to the respective pressure reservoirs (empty circles) are also shown.

In the internal prior art, the filled circles or their start times and also the last start time (Exh_start) are set by the user and the empty circles or the corresponding start times are determined or calculated by the apparatus itself.

The time in ms is plotted on the ordinate and the pressure in bar on the coordinate.

The vertical dotted lines indicate the individual start times t1 for pressurization with the respective pressure level and t2 for the return of the respective pressure level. Within the scope of the invention, it is proposed in particular to determine the start times for the returns (t2).

Figure 4:
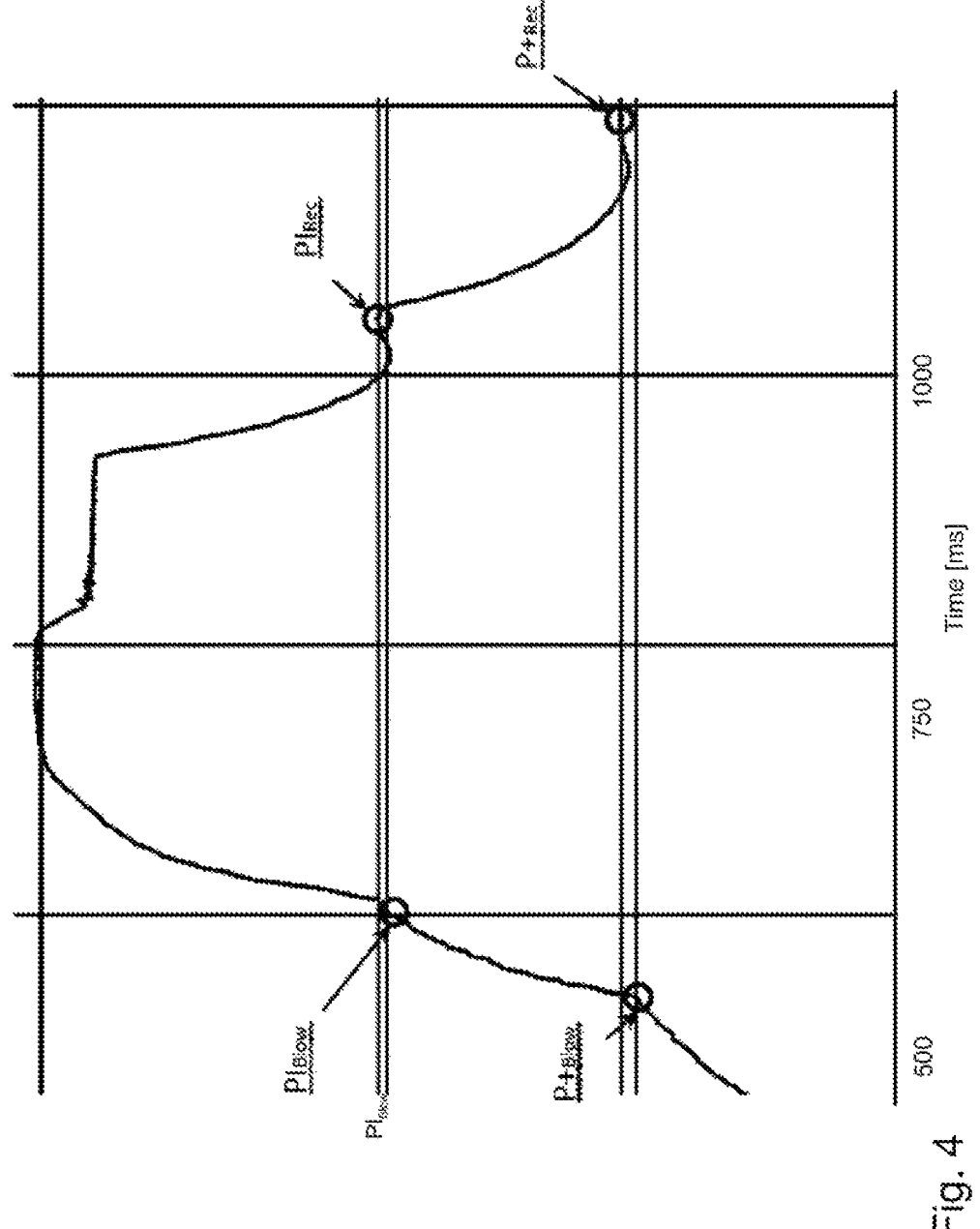
FIG. 4 shows an enlarged section of the representation shown in FIG. 3.

FIG. 4 shows an enlarged section of the blowing curve shown in FIG. 3 and in particular the respective points belonging to the pressure stages P+ and Pi. This shows a blowing curve with characteristic time points.

The pressures measured are also indicated by the horizontal lines. The start times for the recycling phase are controlled in such a manner that there is a minimum pressure difference between the pressures during pressurization and the pressures during discharge. As mentioned above, the nominal variable of the control is preferably the valve opening time of the individual intermediate blowing pressure stages (Pi and P+).

Therefore, the following relationships are considered in the regulation:

$$Pi\_recycling - Pi\_pressurization = min$$

and $$P+\_recycling - P+\_pressurization = min$$

Wherein min stands for minimum.

Figure 5:
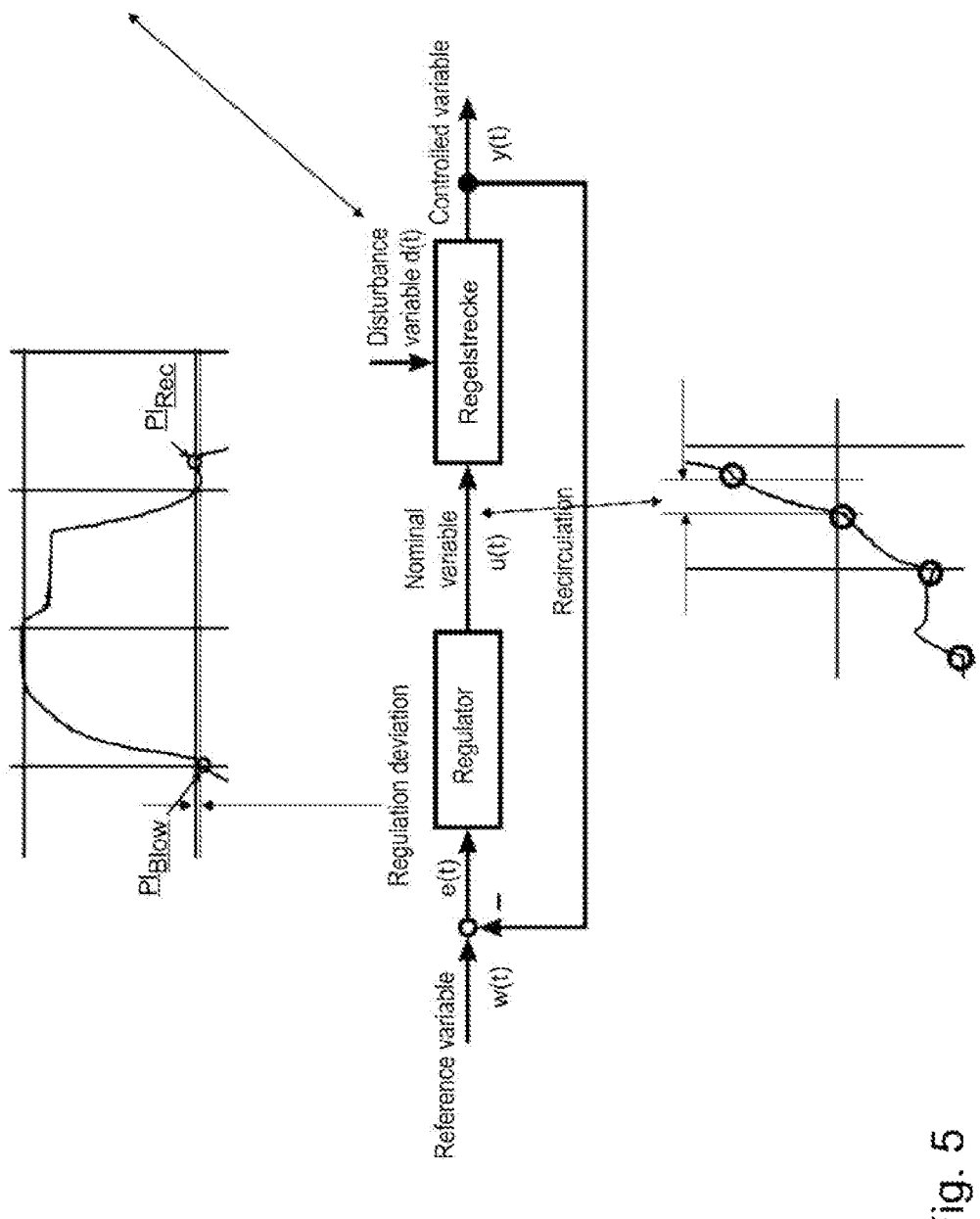
FIG. 5 shows a view of a control system for the individual pressure stages.

FIG. 5 shows a view illustrating the regulation.

The regulation is given a reference variable w(t), approximately a desired minimum pressure difference, for example a pressure difference of less than 0.1 bar. The start times of pressurization and/or recirculation of the flowable medium are used as nominal variables.

Other disturbance variables can be taken into account as part of the controlled system, such as leakage, container bursting, the rejection of containers (particularly prior to the blowing process), measured values or a behavior of a dome pressure regulator, a possible station shutdown, properties of preblow bottles, or even blowing bridging due to a limit value being missed.

The regulation determines the current or actual deviation between the above pressures and feeds this actual value back to the regulation. In this manner, the respective start times of the recirculation of the flowable medium can be determined and/or adjusted (in particular iteratively)

The applicant reserves the right to claim all features disclosed in the application documents as essential to the invention, provided that they are novel over the prior art individually or in combination. It is also pointed out that features which can be advantageous in themselves are also described in the individual figures. The person skilled in the art will immediately recognize that a particular feature described in a figure can be advantageous even without the adoption of further features from this figure. Furthermore, the person skilled in the art will recognize that advantages can also result from a combination of several features shown in individual or in different figures.

The invention claimed is:

1. A method of forming plastic preforms into plastic containers, wherein a plastic preform is expanded into the plastic container by exposure to a flowable medium, wherein the flowable medium is stored under a first pressure in a first pressure reservoir and under a second pressure which is higher than the first pressure in a second pressure reservoir, and wherein the plastic preform is acted upon by a first blowing pressure via a flow connection between the first pressure reservoir and the plastic preform and is acted upon by the second blowing pressure via a flow connection between the second pressure reservoir and the plastic preform, and wherein flowable medium is at least temporarily returned to the first pressure reservoir, wherein first values characteristic of the application of the flowable medium to the plastic preforms are predetermined
   wherein
   taking into account the first values, second values are determined which are characteristic of a start time or a time period of the return of the flowable medium into the first pressure reservoir.

2. The method according to claim 1,
   wherein
   the first values are selected from a group of values consisting of a magnitude of a pressure, a time for the beginning of the application of this pressure to the plastic preforms, and a time for the ending of the application of this pressure to the plastic preform.

3. The method according to claim 1,
   wherein
   the plastic preform is transported along a predetermined transport path and the expansion takes place during this transport.

4. The method according to claim 1,
   wherein the plastic preform is subjected to at least three different pressures for its expansion.

5. The method according to claim 1, wherein an expansion pressure is determined before the application of the plastic preform and/or a recycling pressure is determined during return of the flowable medium into the container.

6. The method according to claim 5, wherein taking into account the expansion pressure and the recycling pressure, the second value is determined and a comparison value is determined taking into account the expansion pressure and the recycling pressure and the second value is determined taking this comparison value into account.

7. The method according to claim 5, wherein the comparison value is a difference and/or a quotient of the expansion pressure and the recycling pressure, and/or the second value is controlled such that this comparison value becomes minimal.

8. The method according to claim 7, wherein at least one valve opening time is changed for regulation.

9. The method according to claim 6, wherein the method is carried out for a plurality of pressure levels and/or pressure reservoirs and the method is initially carried out for at least one higher and then for a lower pressure stage.

10. An apparatus for forming plastic preforms into plastic containers, having at least one forming station which has a pressurizing device which is configured for expanding a plastic preform into the plastic container by application of a flowable medium, having a first pressure reservoir for storing the flowable medium under a first pressure and a second pressure reservoir for storing the flowable medium under a second pressure which is higher than the first pressure and with a first flow connection between the first pressure reservoir and the plastic preform in order to apply a first blowing pressure to the plastic preform via this flow connection between the first pressure reservoir and the plastic preform and with a second flow connection between the second pressure reservoir and the plastic preform in order to apply a second blowing pressure to the plastic preform via the flow connection between the second pressure reservoir and the plastic preform, wherein, furthermore, at least at times flowable medium is returned from the container into the first pressure reservoir, and having a control device which presets first values characteristic of a start time or a time period of the return of the flowable medium from the first pressure reservoir on the plastic preforms wherein taking into account the first values, a processor device determines second values which are characteristic of a time or a time period of the return of the flowable medium into the first pressure reservoir.

11. The apparatus according to claim 10, wherein the apparatus has at least one sensor device configured to detect a pressure of the flowable medium in at least one pressure reservoir or in the container.

12. The apparatus according to claim 10, wherein the apparatus has a comparison device configured to compare an expansion pressure and a recycling pressure with one another and outputs at least one value which is characteristic of the comparison.

13. The apparatus according to claim 10, wherein the forming station has a valve arrangement configured to control the application of the flowable medium to the plastic preform and/or the return of the flowable medium to at least one pressure reservoir, wherein the controlling preferably takes place at least partially taking into account a value which is characteristic of a comparison between an expansion pressure and a recycling pressure.

* * * * *